Dec. 10, 1968                E. L. CLINE                 3,415,113
                    VEHICLE EXHAUST HANDLING SYSTEM
Filed Dec. 27, 1965                                10 Sheets-Sheet 2
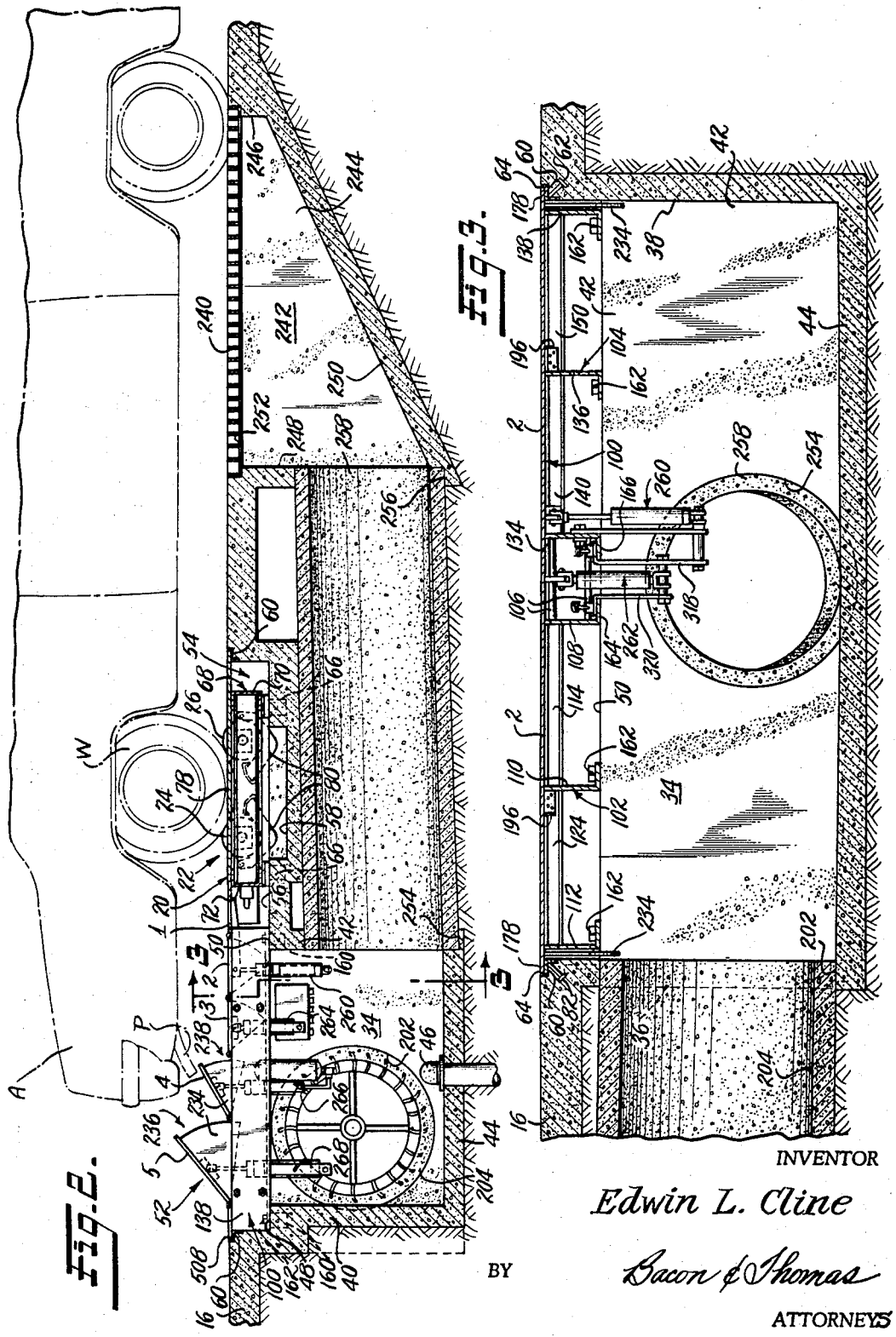
INVENTOR
Edwin L. Cline
BY
Bacon & Thomas
ATTORNEYS Dec. 10, 1968  E. L. CLINE  3,415,113
VEHICLE EXHAUST HANDLING SYSTEM
Filed Dec. 27, 1965  10 Sheets-Sheet 3
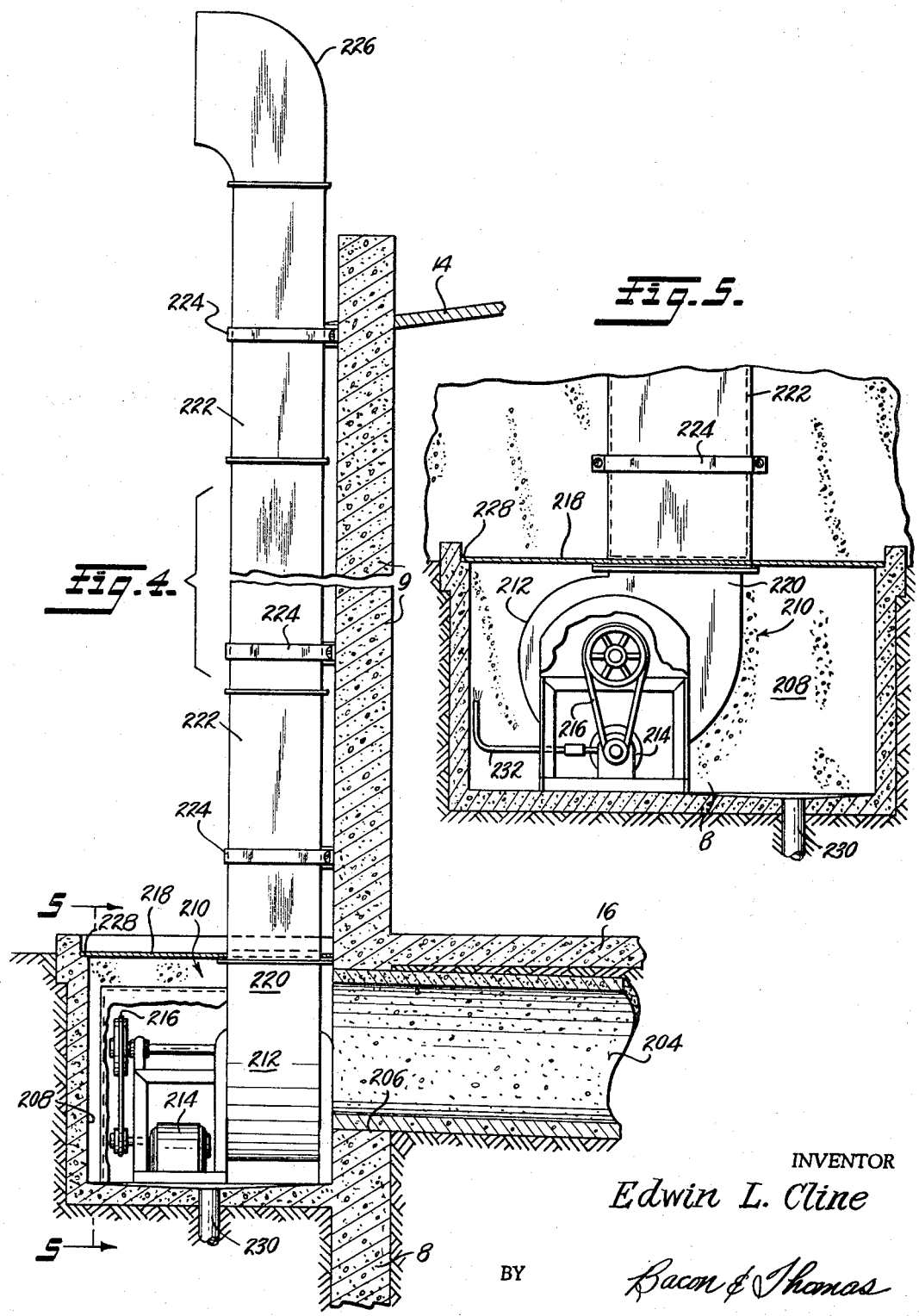
INVENTOR
*Edwin L. Cline*
BY  *Bacon & Thomas*
ATTORNEYS

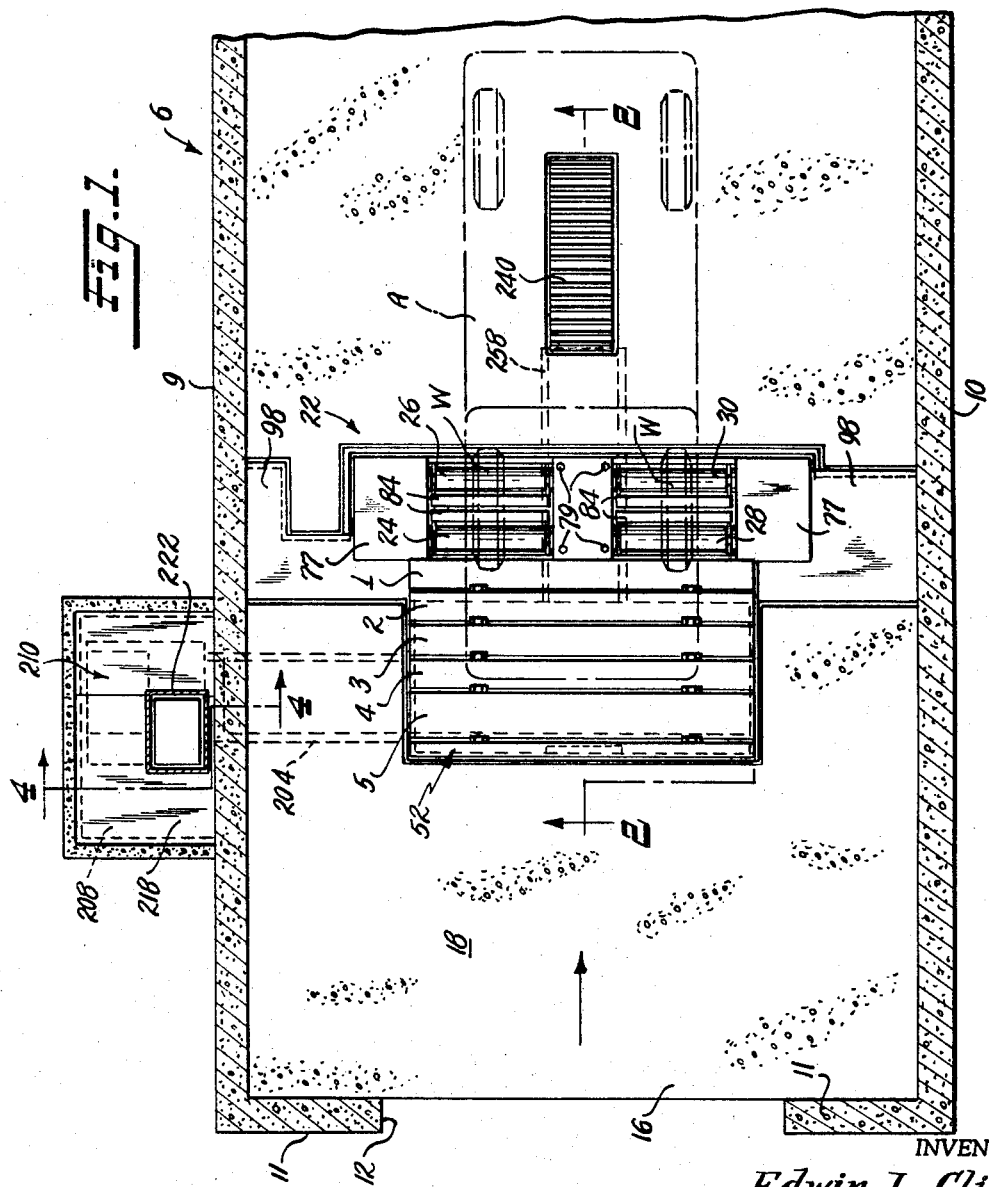

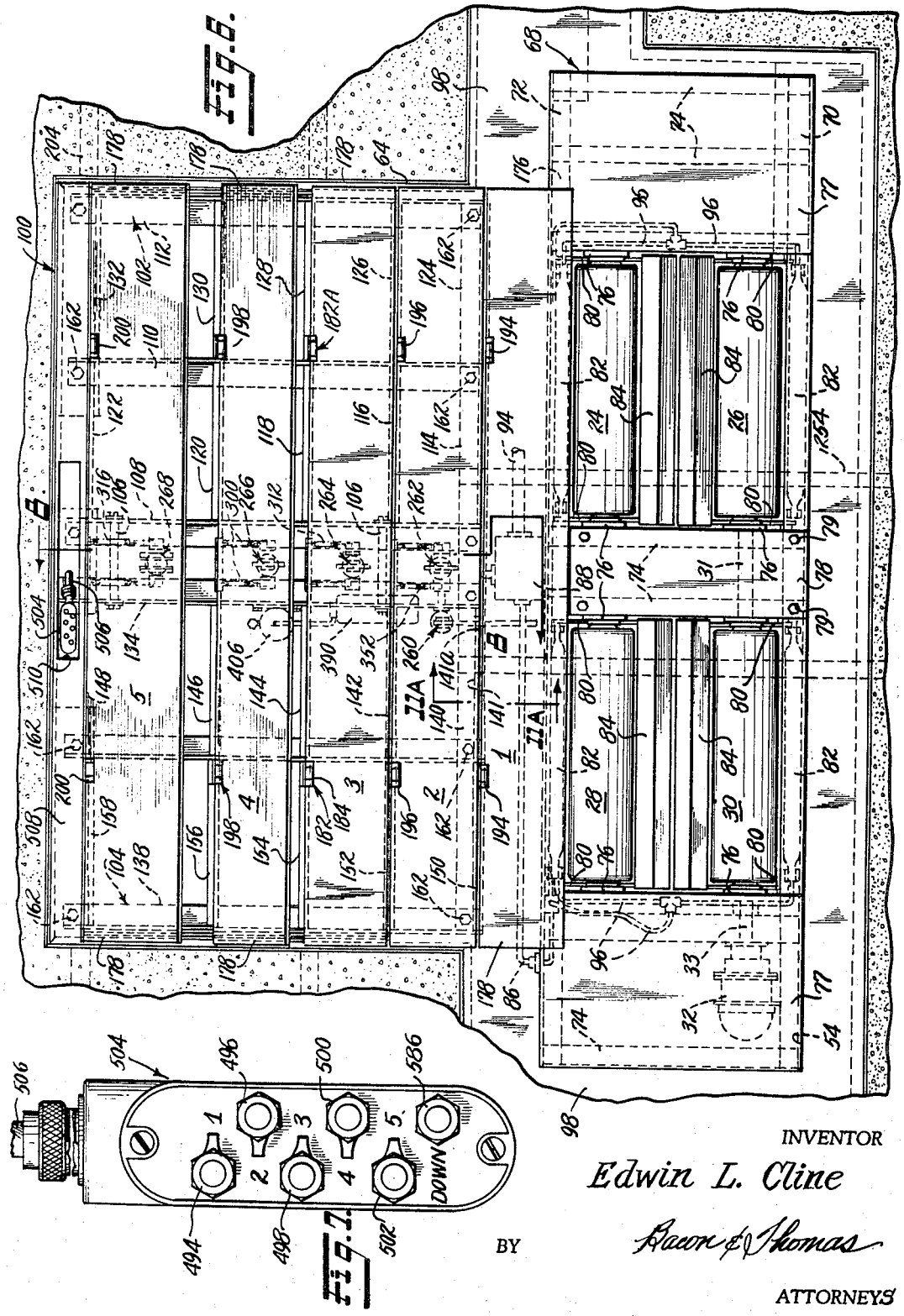

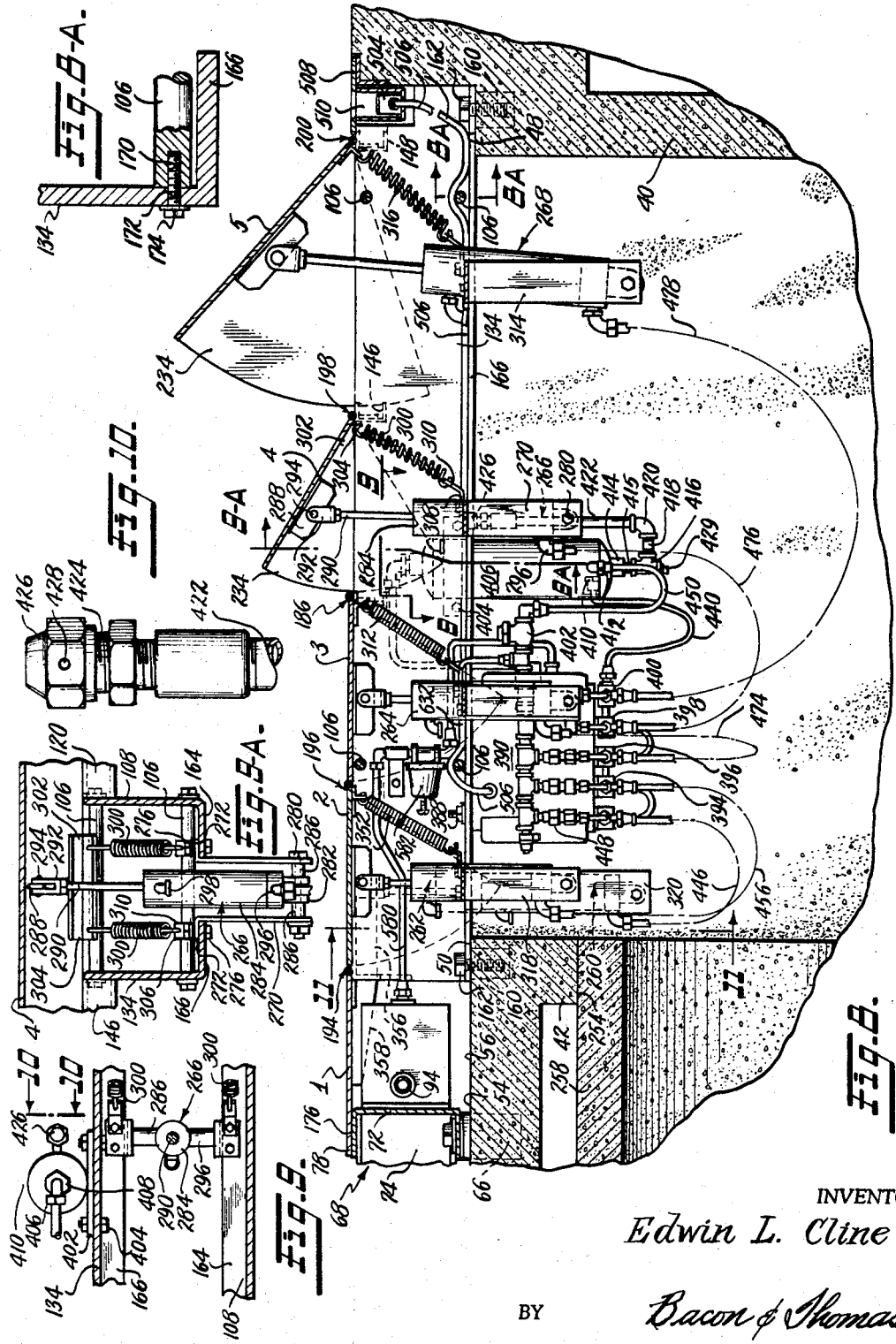

INVENTOR
Edwin L. Cline
BY Bacon & Thomas
ATTORNEYS

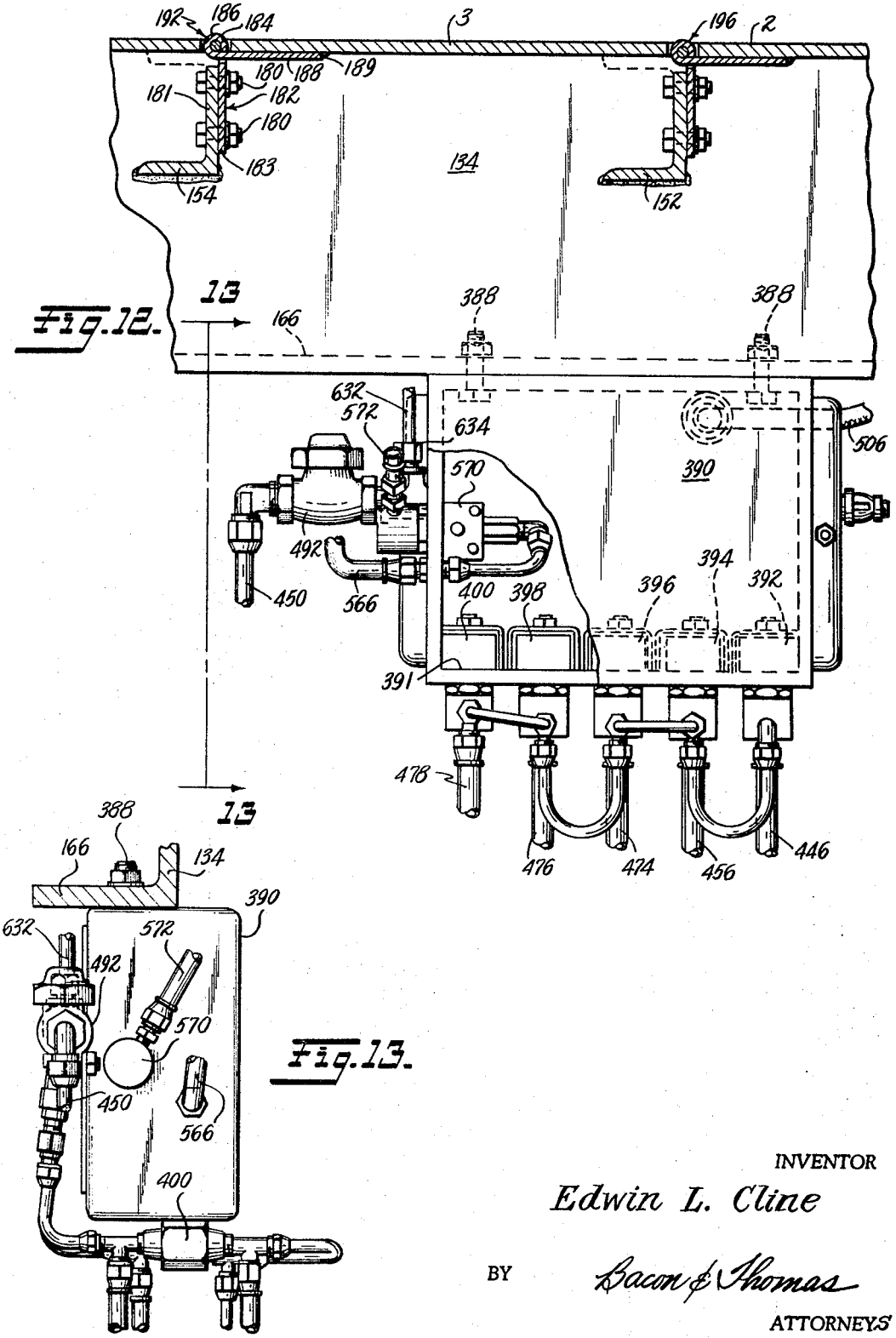

Dec. 10, 1968  E. L. CLINE  3,415,113
VEHICLE EXHAUST HANDLING SYSTEM
Filed Dec. 27, 1965  10 Sheets-Sheet 8
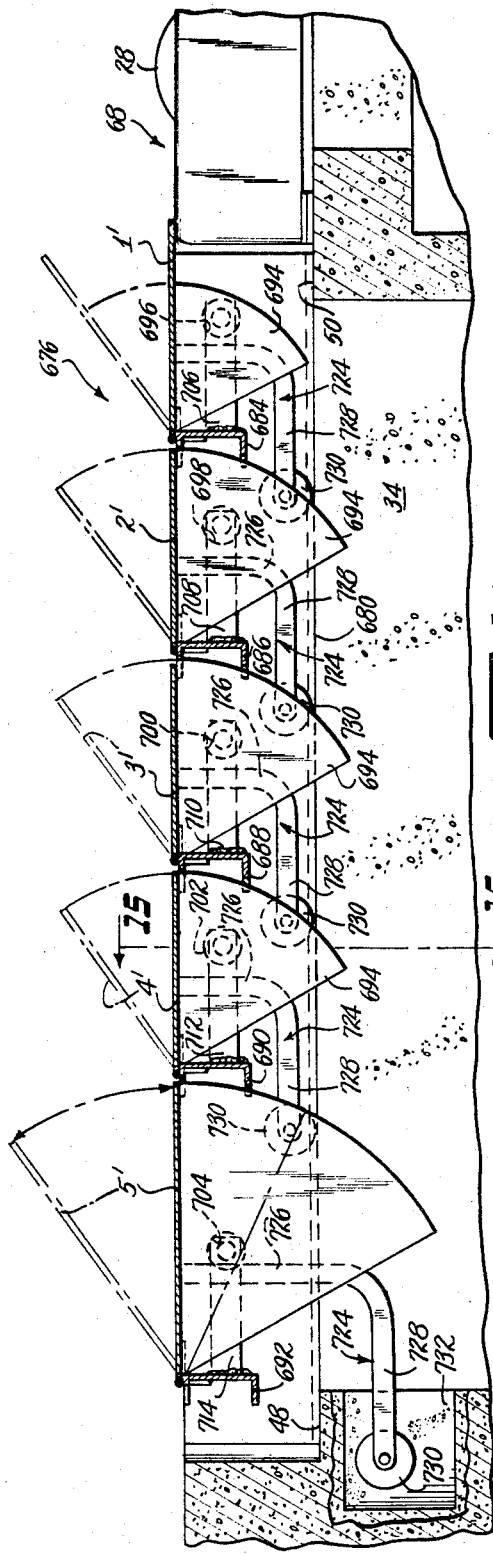
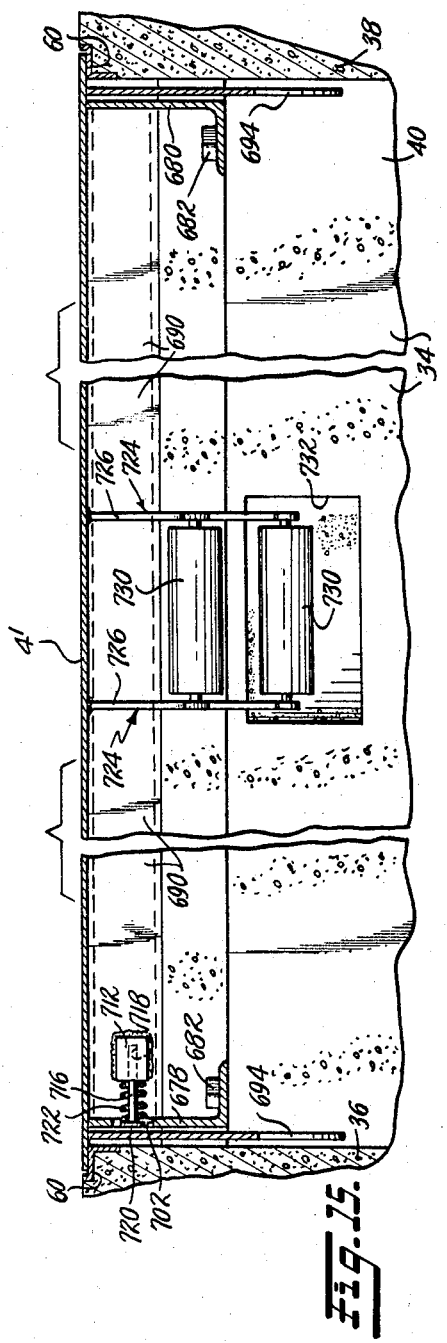
INVENTOR
Edwin L. Cline
BY Bacon & Thomas
ATTORNEYS

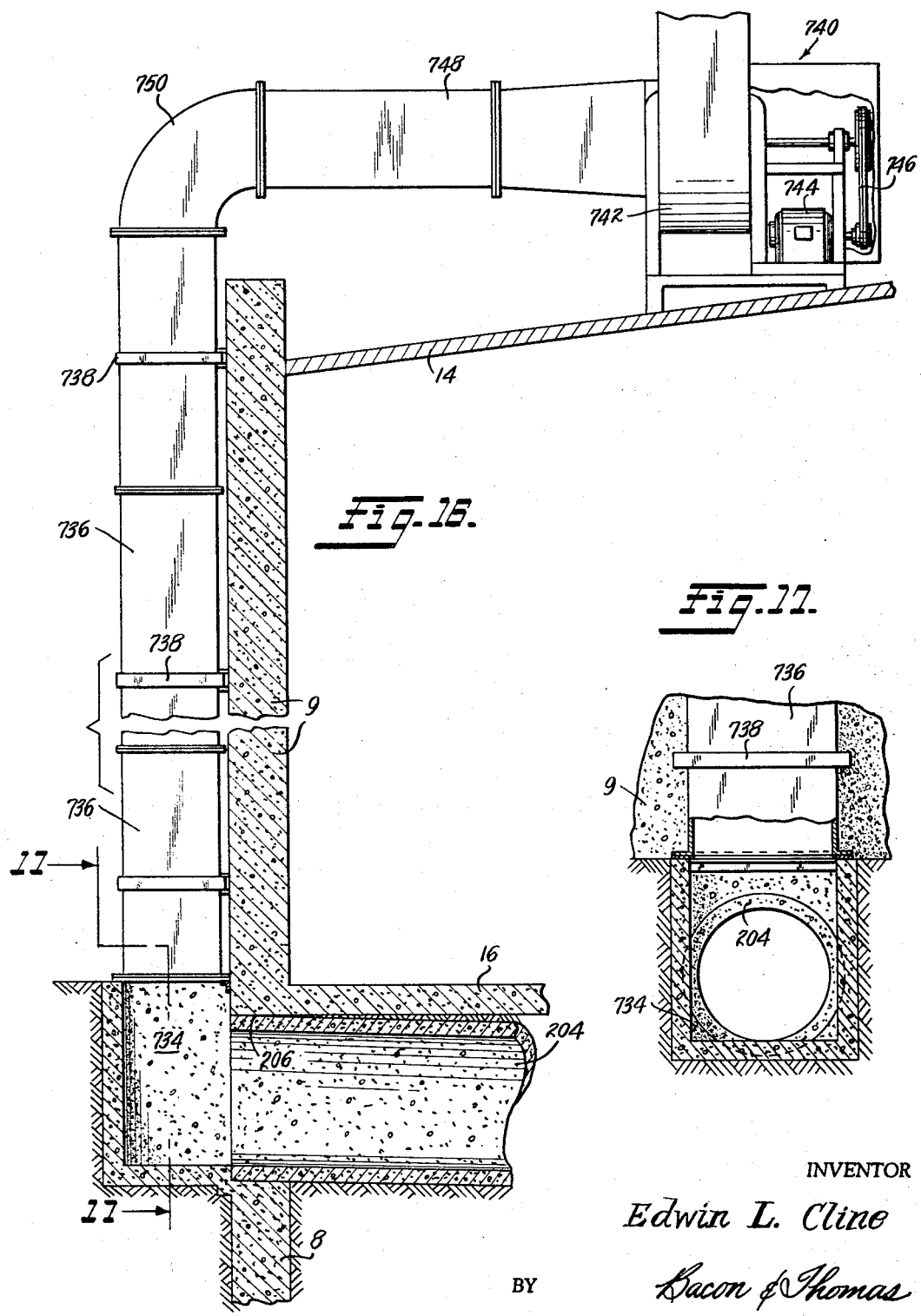

Dec. 10, 1968   E. L. CLINE   3,415,113
VEHICLE EXHAUST HANDLING SYSTEM
Filed Dec. 27, 1965   10 Sheets-Sheet 10

INVENTOR
Edwin L. Cline
BY Bacon & Thomas
ATTORNEYS

United States Patent Office 3,415,113
Patented Dec. 10, 1968

3,415,113
VEHICLE EXHAUST HANDLING SYSTEM
Edwin L. Cline, Pasadena, Calif., assignor to Clayton Manufacturing Company, El Monte, Calif., a corporation of California
Filed Dec. 27, 1965, Ser. No. 516,365
20 Claims. (Cl. 73—117)

ABSTRACT OF THE DISCLOSURE

A system for handling the exhaust products from a motor vehicle positioned stationarily on a floor, the floor having an upwardly opening chamber therein. A frame is mounted at the upper end of the chamber, and supports a plurality of transversely disposed, individually operated shutters. Each shutter is hinged along its rear edge to the frame, and is movable between a closed horizontal position resting on the frame, to an open inclined position wherein it defines a forwardly facing passage. Exhaust fan means is connected to the chamber, and is effective to draw air and entrained exhaust products from beneath the motor vehicle through the open shutters to discharge.

---

This invention relates generally to exhaust systems for removing from a garage, car care center, or the like, engine exhaust gases and other incidental gaseous products of a motor vehicle being operated therein. More particularly, the invention relates to a practical vehicle exhaust handling system for rapidly and efficiently removing motor vehicle engine exhaust gases and other gaseous engine products from an enclosed space by effecting the entrainment thereof in a current of air drawn from beneath the motor vehicle into a chamber below the floor and, thence, discharged into the atmosphere. In this connection, the system is compatible with motor vehicles within a large range of vehicle lengths and vehicle exhaust equipment of numerous different designs.

When the engine of a motor vehicle is operated within an enclosed space, such as in a service center, for the purpose of performance testing the vehicle to determine the need, if any, for corrective adjustments or repairs to the engine, the brake system, or other functional portions of the vehicle, large quantities of exhaust gas, radiated heat, and engine blow-by or crankcase-vented products, are expelled. These waste products, and particularly those which contain carbon monoxide, must be continuously removed from the enclosed space to avoid the serious danger of poisoning or injury to the health of persons working therein, and to prevent the build-up of undesirable odors and heat. The problem of removing such waste products is especially acute in service centers using modern chassis dynamometer testing equipment which enables testing of a motor vehicle while the engine is operating at low and high driving speeds, whereunder large quantities of exhaust gas are discharged from the vehicle.

The removal of engine exhaust products is rendered complex because these are usually not discharged from a single position on a motor vehicle. The principal source of exhaust gas is from one or more muffler tail pipes, the open end of which is normally disposed in some area at the rear end of the vehicle. However, leaks are often present in the tail pipe and muffler which themselves may be defective, so that some exhaust gases are discharged forwardly of the discharge end of the tail pipe. In addition, objectionable gases are often discharged directly from the engine crankcase breather pipe along with engine blow-by products. Waste heat, of course, is radiated from the engine, and along the length of the muffler and tail pipe assembly.

It is the principal object of the present invention to provide a vehicle exhaust handling system that will rapidly and efficiently collect engine waste products from beneath a motor vehicle within an enclosed space, regardless of the point on the vehicle at which such products are discharged, and which will remove such products from said enclosure and exhaust them into the outside atmosphere.

In the present vehicle exhaust handling system, collection of engine waste products is effected by drawing air from beneath the motor vehicle to create a current of air for entraining waste products therein. The current of air, with its entrainments, is drawn into a chamber disposed below the floor level of the enclosing structure and is then discharged into the outside atmosphere. Thus, the invention requires the withdrawing of air from the enclosed structure, and which air must be replaced by a supply of air to the enclosure from the outside, or from another part of the structure. The rate of air exchange must be sufficiently great to provide for proper operation of the exhaust system, but should not be so large as to result in excessive ventilation and air heating or cooling requirements, or in undesirable drafts within the enclosure.

Another object of the invention, therefore, is to provide a vehicle exhaust handling system for rapidly and efficiently removing from a room, or other enclosed area, engine exhaust products discharged by a running motor vehicle disposed therein, and which system effects exchange of the air within the enclosure at a rate acceptable from the standpoints of ventilation, air heating, air cooling, and economy of operation.

A further object is to provide a vehicle exhaust gas handling system which is compatible with, and which can be rapidly adjusted to accommodate motor vehicles and vehile exhaust equipment of various designs.

Still another object is to provide a vehicle exhaust gas handling system for a room, or other enclosed area, wherein the apparatus for collecting engine waste gas products is disposed in the floor of the structure, and is designed so that when not in operation a motor vehicle can be readily driven thereover.

Another object is to provide a vehicle exhaust gas handling system for removing from a room, or other enclosed area, waste products exhausted by the engine of a motor vehicle, and which will effect the circulation of air through the enclosure even when not being employed to collect and remove engine waste gas products.

A more specific object is to provide for use in a vehicle exhaust gas handling system, a shutter assembly comprising a plurality of transversely extending, upwardly opening, individually operated shutters designed to cooperate with muffler tail pipe means of a motor vehicle and blower means to provide a guided air flow beneath said vehicle for efficiently collecting and disposing of engine waste gas products.

Still another object is to provide a vehicle exhaust gas handling system, as described above, which is compatible for use with chassis dynamometer equipment for performance testing a motor vehicle, and which is interlocked with the wheel lift apparatus of such dynamometer equipment to prevent the simultaneous operation of the shutters and the wheel lift apparatus.

Other objects and many of the attendant advantages of the invention will become readily apparent from the following detailed description, when taken in connection with the accompanying drawings, wherein:

FIG. 1 is a horizontal fragmentary sectional plan view through a building structure containing the present vehicle exhaust handling system associated with a chassis dynamometer;

FIG. 2 is an enlarged vertical sectional view taken on the line 2—2 of FIG. 1, showing the gas collection chamber and the two rearmost shutters of the shutter assembly in open position for collecting exhaust gas from the muffler tail pipe of a motor vehicle positioned upon the dynamometer;

FIG. 3 is an enlarged fragmentary sectional view taken on the line 3—3 of FIG. 2;

FIG. 4 is an enlarged fragmentary vertical sectional view, taken along the line 4—4 of FIG. 1, showing an exhaust fan for the gas collection chamber and a vertical exhaust stack;

FIG. 5 is a fragmentary sectional view, taken on the line 5—5 of FIG. 4, showing the exhaust fan in side elevation;

FIG. 6 is an enlarged fragmentary plan view of the shutter assembly, and the wheel-supporting rolls of a chassis dynamometer, the two rearmost shutters being shown in open position, as in FIG. 2;

FIG. 7 is an enlarged plan view of a pendant remote control unit for the shutter assembly;

FIG. 8 is an enlarged vertical sectional view, taken on the line 8—8 of FIG. 6, showing the details of the shutter assembly, including the individual hydraulic jacks for operating the shutters;

FIG. 8A is an enlarged fragmentary vertical sectional view, taken on the line 8A—8A in FIG. 8, showing a detail of the sub-frame of the shutter assembly;

FIG. 9 is a fragmentary horizontal sectional view, taken on the line 9—9 of FIG. 8, showing a hydraulic fluid pressure tank mounted on the supporting frame of the shutter assembly;

FIG. 9A is a fragmentary vertical sectional view, taken on the line 9A—9A in FIG. 8, showing one of the hydraulic jacks for opening one of the shutters, and the return springs for closing said shutter;

FIG. 10 is a fragmentary elevational view of the cap structure of the bleeder pipe for the hydraulic fluid tank as seen from the line 10—10 of FIG. 9;

FIG. 12 is a fragmentary elevational view, showing the manner in which the shutters are hingedly connected to the shutter frame, and also showing the control box and the solenoid valves for use in actuating the hydraulic jacks of the shutter assembly;

FIG. 13 is a fragmentary elevational view as seen on the line 13—13 of FIG. 12;

FIG. 14 is a fragmentary vertical sectional view of a modified form of the shutter assembly, wherein the individual shutters are counterweighted and manually operated;

FIG. 15 is a transverse sectional view, taken on the line 15—15 of FIG. 14, showing one of the detents for holding the shutters in adjusted position;

FIG. 16 is a fragmentary vertical sectional view similar to FIG. 4, showing a modified arrangement for the blower and exhaust stack, wherein the blower is mounted on the roof of the building instead of in a pit;

FIG. 17 is a sectional view, taken on the line 17—17 of FIG. 16; and

Figure 11:
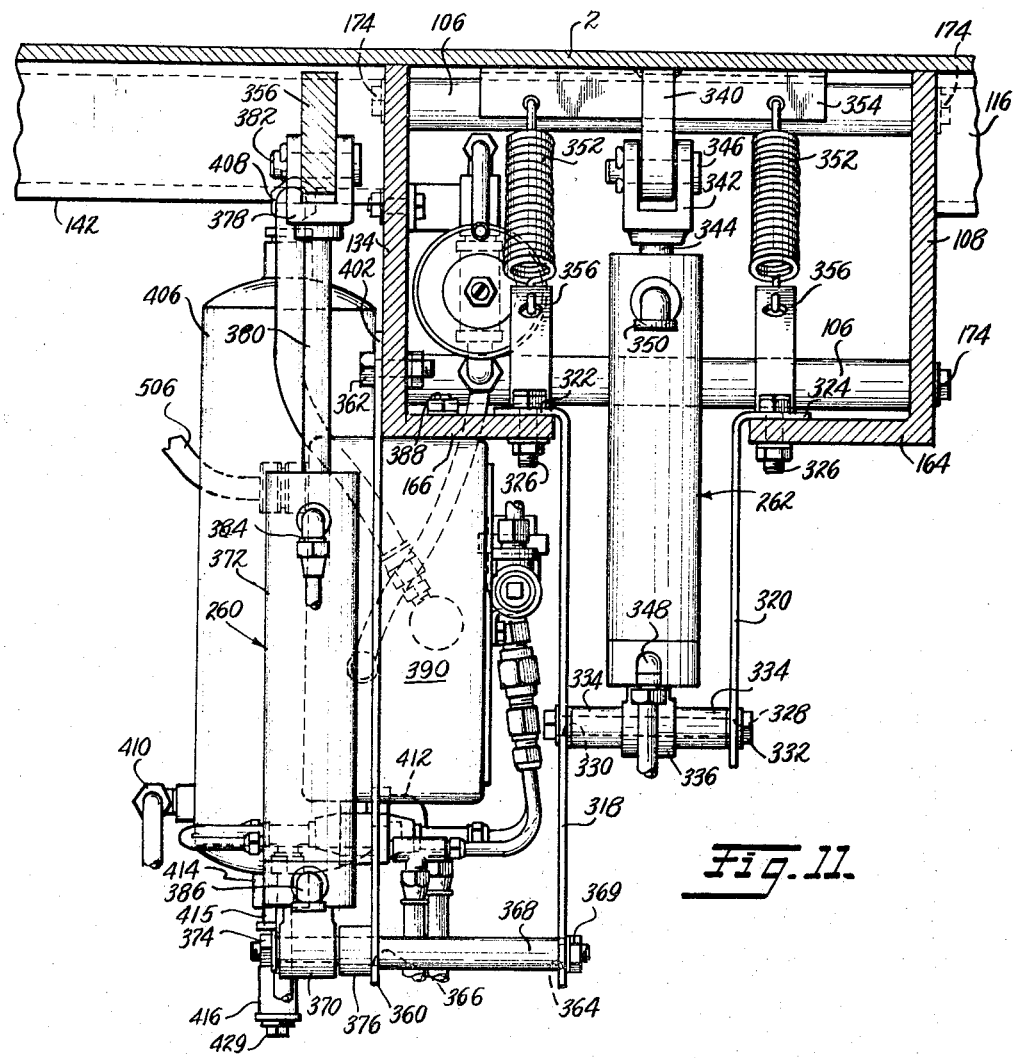
FIG. 11 is an enlarged fragmentary vertical sectional view, taken on the line 11—11 of FIG. 8, showing the hydraulic jacks for operating the two foremost shutters.

Referring now to the drawings, the vehicle exhaust gas handling system of the invention is shown installed within a building 6 constructed on footings 8, and including side walls 9 and 10, an end wall 11 having a centrally positioned doorway 12 therein, and a roof 14 (FIG. 4). The building 6 has a concrete floor 16 therein with a lane 18 in alignment with the doorway 12, and along which a motor vehicle A can be driven to position the driving wheels thereof on the rolls of a chassis dynamometer 22 for performance testing the vehicle.

The construction of the dynamometer 22 is not a part of this invention, and can be of the type shown in my Patent No. 2,768,711, or in my copending application, Ser. No. 453,611. Briefly, the purpose of the dynamometer 22 is to performance-test a motor vehicle while it remains in a stationary position in the lane 18 with its engine running. For example, the engine may be operated at various speeds to determine such performance characteristics as the horsepower being developed, the correctness of the timing, spark plug firing, need for adjustment of the carburetor, if any, etc. The dynamometer may also include a brake tester for determining the operating effectiveness of the vehicle brakes.

The dynamometer 22 includes two pairs of cylindrical rolls 24 and 26, and 28 and 30, respectively, on which the vehicle drive wheels W are received. The two rear rolls 24 and 28 are idle rolls, and are mounted for free rotation. The two front rolls 26 and 30 are interconnected by a shaft 31, and are connected to a power absorption unit 32 by a shaft 33, which unit 32 can be of the type shown in my Patent No. 2,768,711, supra.

Referring now in particular to FIGS. 1–3, 6 and 8, the concrete floor 16 has a transverse, upwardly opening, rectangular chamber 34 formed therein and disposed rearwardly of the dynamometer 22. The chamber 34 has concrete sidewalls 36 and 38 (FIG. 3), a rear wall 40, a front wall 42 (FIG. 2), and a bottom wall 44 having a drain 46 installed therein for removing any liquid that may collect in the chamber 34. The rear wall 40 has an offset therein near its upper end, which forms an internal ledge 48. The front wall 42 terminates short of the top surface of the floor 16 in a ledge 50. The ledges 48 and 50 support the opposite sides of a shutter assembly 52.

Extending forwardly from the chamber 34 is a shallow pit 54, including a bottom wall 56 which lies in the same plane as the ledges 48 and 50, and which has an upwardly opening depression 58 therein beneath each pair of rolls 24–26 and 28–30.

The top edges around the chamber 34 and around the pit 54 are lined with embedded, downwardly facing angle irons 60, the top surfaces of which are depressed below the top surface of the floor 16. The angle irons 60 are secured in position by spaced apart, headed studs 62 (FIG. 3) welded thereto to extend downwardly at about a 45° angle, and embedded in the concrete floor 16. Rectangular strips 64 are welded to the top leg of the angle irons 60 immediately adjacent the concrete of the floor 16, the top surface thereof being flush with the top surface of said floor.

The construction and operation of the dynamometer 22 is the subject of my application, Ser. No. 453,611, and hence will not be described in extensive detail herein. Briefly, however, the dynamometer includes pneumatically operable apparatus to brake the rolls 24 to 30 so that an automobile can be readily driven thereoff, such braking normally not being required while an automobile is being driven onto the dynamometer to position the drive wheels W between said rolls. The apparatus for braking the rolls 24 to 30 includes wheel lift apparatus operable to raise the drive wheels W out of contact with said rolls when the rolls are braked, so that the vehicle A can be readily driven off the rolls.

The bottom wall 56, FIG. 2, of the pit 54 has a plurality of anchors 66 embedded therein, to which the dynamometer frame 68 is secured. The frame 68 comprises confronting, parallel front and rear channel members 70 and 72, respectively, FIG. 6, which are interconnected by transverse channel members 74. The longitudinal channel members 70 and 72 are secured to the anchor members 66, and the pit 54 is of such a depth that the top surface of channel members 70 to 74 lies flush with the ledges defined by the top surface of the angle irons 60. The rolls 24 to 30 are mounted on the frame 20 by suitable bearings 76, and the portion of the frame 68 lying between the rolls is covered by a plate 78 secured in position by screws 79. The portions of the frame 68 outwardly of the rolls 24 to 30 are covered by plates 77.

The rolls 24 and 26, and the rolls 28 and 30, are parallel and are suitably spaced apart to cradle the drive wheels W therebetween. At the opposite ends of each roll 24 to 30 is a lift arm 80, FIG. 18. The arms 80 are arranged in pairs, one pair for each roll, and are pivoted at one end thereof to the frame 68 outwardly of their associated rolls. Each pair of lift arms 80 is joined by a plate 81 that carries a brake shoe element 83 that is engageable with the associated roll when the arms 80 are pivoted theretoward. Disposed beneath and behind each plate 81 is an inflatable tubular diaphragm 82, FIG. 6, which, when inflated urges its associated arm 80 toward its associated roll to engage the brake shoe element 83 carried thereon with said roll. The diaphragms 82 are interconnected with each other by conduit means, to provide for simultaneous operation of all four, as will be explained later.

Figure 18:
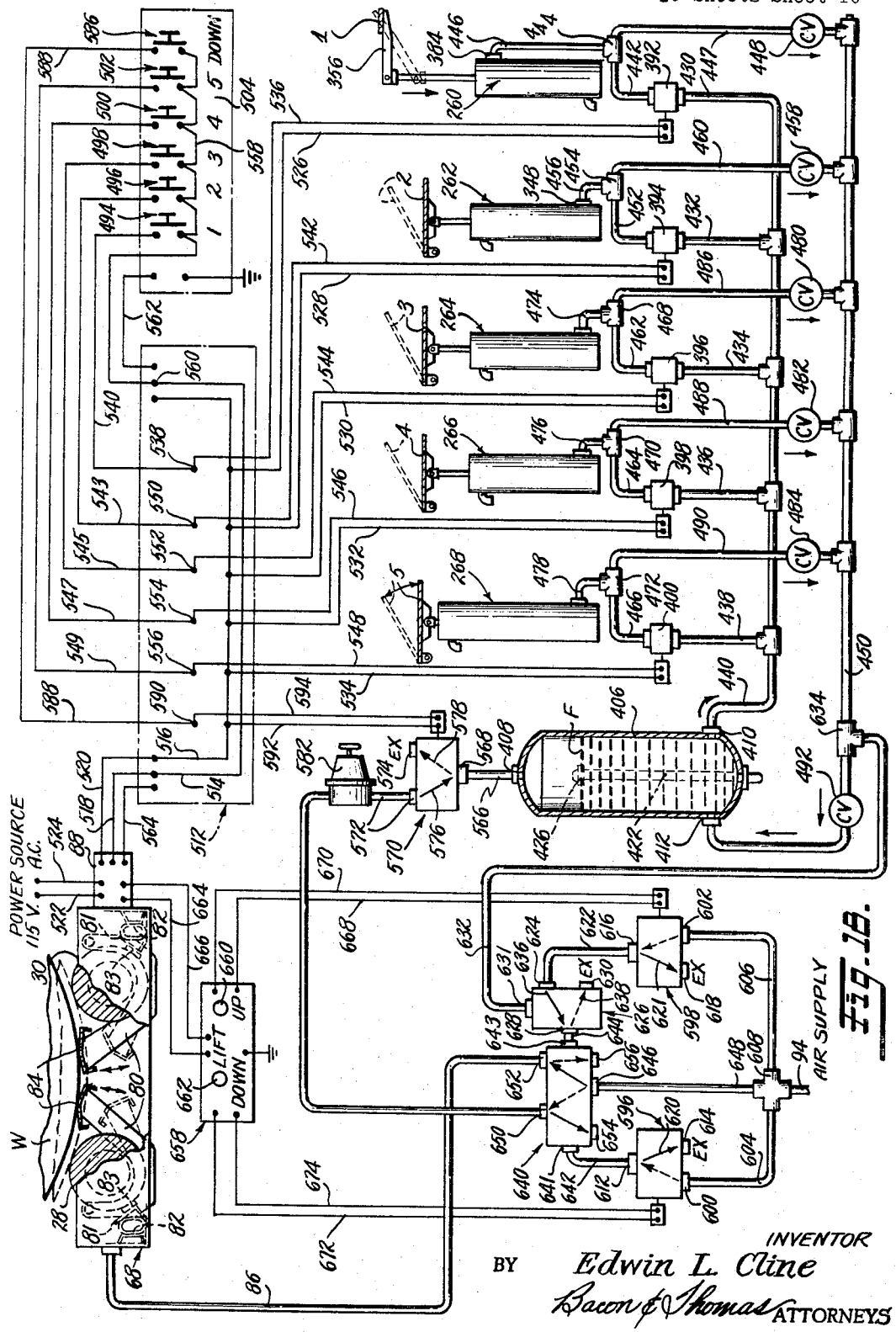
FIG. 18 is a diagrammatic view showing the electrical and hydraulic circuits, and the pneumatic, electrical, and hydraulic components comprising the vehicle exhaust control system, and also showing how the vehicle exhaust system is interlocked with the control for the vehicle wheel lift apparatus of the chassis dynamometer.

The inner end of the pairs of arms 80 extends into the space between the rolls of each pair of rolls, and has a lift plate 84 welded to extend therebetween. Referring to FIG. 18, when the tubular diaphragms 82 are simultaneously inflated to cause the brake shoe elements 83 carried on the plates 81 to engage their associated rolls, the inner end of said arms simultaneously move upwardly, so that the lift plates 84 engage the driving wheels W and raise them out of contact with the rolls 24 to 30. When air pressure within the tubular diaphragms 82 is relieved, the arms 80 drop by gravity to the position shown in FIG. 2, wherein they are partially received within the depressions 58 and offer no interference to the operation of the rolls 24 to 30.

The inflatable diaphragms 82, FIG. 6, are simultaneously supplied with air under pressure from a conduit 86 that extends from valve apparatus housed in a control box 88 mounted on the outer face of the rear channel member 72 of the frame 68 and which valve apparatus is supplied with air pressure through a supply conduit 94. The individual tubular diaphragms 82 are connected with the conduit 86 by branch conduits 96, disposed within the frame 68.

The portions of pit 54, FIG. 6, disposed outwardly of the frame 68 are utilized to house various components of the dynamometer 22, as well as electrical wiring and fluid conduits. These portions of the pit 54 are covered by plates 98 supported on the ledges defined by the angle irons 60, the top surface of which lies flush with the top surface of the floor 16. Thus, only the crest of the rolls 24 to 30 projects slightly above the level of the floor 16.

The shutter assembly 52, FIGS. 2, 6 and 8 is designed to collect engine exhaust products discharged by the motor vehicle A disposed with its driving wheels W on the rolls 24 to 30. The shutter assembly 52 has a supporting frame 100 comprising a pair of sub-frames 102 and 104, which are supported on the ledges 48 and 50 in side-by-side relationship, and which are joined together by spacer rods 106. The sub-frame 102, FIG. 3, comprises three parallel angle irons 108, 110 and 112, disposed with their horizontal bottom flanges facing in a common direction toward the center of the chamber 34. The angle irons 108 and 110 are connected at their top edges by rearwardly facing channel members, numbered 114, 116, 118, 120 and 122 from the front of the shutter assembly 52 to the rear thereof. The angle irons 110 and 112 are connected by similar channel members 124, 126, 128, 130 and 132, which are aligned with their corresponding angle irons 114 to 122, respectively. The channel members 114 to 132 extend parallel to each other, and transversely of the lane 18 on the floor 16. The front four sets of aligned channel members 114, 116, 118 and 120, and 124, 126, 128 and 130 are spaced equally apart; whereas, the rearmost channel members 122 and 132 are spaced from their adjacent channel members 120 and 130 a distance about one and one-half times the distance between the front four sets of channel members.

The sub-frame 104 is constructed in the same manner as the sub-frame 102, and includes angle irons 134, 136 and 138. The angle irons 134, 136 are interconnected by a fabricated angle iron 140 and by rearwardly facing channel members 142, 144, 146 and 148. The angle irons 136 and 138 are connected by channel members 150, 152, 154, 156 and 158. As is best shown in FIG. 11A, the fabricated angle iron 140 includes a vertical plate 141 welded between the front ends of the angle irons 134 and 136, and a horizontal top plate 143. The angle iron 140 and channel members 142 to 158 of the sub-frame 104 are aligned with their corresponding channel members 114 to 132 on the sub-frame 102, and hence said channel members define rectangular openings therebetween which extend longitudinally of the chamber 34 and transversely of the lane 18, the frame 100 being sufficiently long to extend beyond both sides of a motor vehicle A positioned with its rear wheels W on the dynamometer rolls 24–26 and 28–30.

Anchors 160 are embedded in the ledges 48 and 50, and the opposite ends of the angle irons 102, 110 and 112 of the sub-frame 102, and 134, 136 and 138 of the sub-frame 104, are secured to the anchors 160 by bolts 162. As is shown in FIG. 3, when the sub-frames 102 and 104 are secured in position, the outer side of the angle irons 112 and 138 will be spaced inwardly from the sidewalls 36 and 38 of the chamber 34. The vertical flanges of the confronting angle irons 108 and 134, as has been described, are secured together by the spacer rods 106, which also function to accurately space said vertical flanges. The spacer rods 106 are arranged in vertically disposed pairs, one pair being positioned just rearwardly of the channel members 116 and 142, FIG. 6, and the other pair being positioned in front of the channel members 122 and 148. Referring to FIG. 8A, the spacer rods 106 have threaded bores 170 in their opposite ends, which are positioned to confront openings 172 extending through the vertical flanges of the angle irons 108 and 134. Bolts 174 are passed through the openings 172 and are threaded into the bores 170 to secure the spacer rods 106 in position.

The aligned front channel members 114, 124 and 150, and the angle member 140, are spaced rearwardly from the rear channel element 72 of the dynamometer frame 68 a distance about equal to the distance between said channel members and the next adjacent channel members 116, 126, 142 and 152. Thus, a rectangular opening is provided between the shutter assembly supporting frame 100 and the dynamometer roll-supporting frame 68, which opening is in communication with the chamber 34 through the rear, open end of the pit 54 across the ledge 50, FIG. 2.

The top surface of the channel members 114 to 132 and 140 to 158 lies flush with the top edge of: the associated angle irons 108 to 112 and 134 to 138, the top surface of the angle irons 60, and the top surface 176 of the rear channel member 72 of the frame 68, the rear portion of the latter surface 176 not being covered by the plates 78 and 77, FIG. 8.

Attached to the frame 100 of the shutter assembly 52 are five shutters, numbered 1 through 5, running from the front of said shutter assembly to the rear thereof. Each shutter 1 to 5 comprises a rectangular metal plate of greater length than the frame 100, so that the opposite end portions 178, FIG. 6 thereof are receivable on the ledges defined by the top surface of the angle irons 60 surmounting the chamber sidewalls 36 and 38. The rectangular shutter plates 1 to 5 are hingedly connected along their rear edge to the parallel, longitudinally extending connecting members 114, 124; 126, 152; 128, 154; 130, 156; and 132, 158, respectively, of the frame 100. The hinge arrangement for connecting the shutter plates 2 and 3 to the channel members 152 and 154, respectively, is shown in enlarged vertical cross-section in FIG. 12.

Referring now to FIG. 12, the top flange of the channel members 152 and 154 is cut away for a short distance at its inner end. Secured by bolts 180 to the front face of the vertical web 181 of the channel member 154, in the region of the cutout in the top flange, is a hinge 182 having a vertically disposed section 183. The rear edge of the shutter 3 has a notch 184 therein disposed over the hinge section 183. Received within the notch 184 is the pin-receiving portion 186 of a cooperating hinge section 188. The hinge section 188 is welded around its edges to the lower face of the shutter 3, as indicated at 189. The hinge section 188 is disposed so that its top surface 190 lies flush with the top surface of the channel members 152 and 154 when the hinge sections 188 and 183 are connected by a hinge pin 192. The shutter 3 is connected to the channel member 128, FIG. 6, by a hinge structure 182A identical to the hinge 182 shown in FIG. 12.

Each of the shutters 1, 2, 4 and 5 is mounted on its associated channel members by pairs of hinges 194, 196, 198 and 200, respectively, FIG. 6, identical with the hinge assembly 182 shown in FIG. 12 for the shutter 3. Thus, it is seen that when the shutters 2 to 5 are closed, the rear longitudinal edge thereof will be supported by the associated hinge structures and by the top edge of the angle irons 108, 110 and 112, and 134, 136 and 138; that the front longitudinal edge thereof will be supported on the rearwardly directed top flange of the connecting members 114, 116, 118 and 120; 124, 126, 128 and 130; 140, 142, 144 and 146; and 150, 152, 154 and 156, respectively; and that their side edges 178 will be supported by the angle irons 60, FIG. 3, atop the chamber sidewalls 36 and 38. The front edge of the shutter 1 rests upon the flange surface 176 of the channel member 72 of the dynamometer frame 68 when said shutter is closed, and the rear edge thereof is supported by the hinges 194. When closed the shutters 1 to 5 lie flush with the top surface of the concrete floor 16, and because of the manner in which they are then structurally supported, a motor vehicle can be safely driven thereover.

The shutters 1 to 5 can be individually moved to an open, upwardly inclined position to provide passages leading to the chamber 34, through which air and engine exhaust gas can be drawn. The sidewall 36 of the chamber 34 has a large circular opening 202 therein, within which is secured the inner end of an upwardly inclined circular duct 204, FIG. 3. The duct 204 leads through an opening 206 in the footing 8, FIG. 4, to a pit 208 outside the building. Disposed within the pit 208 is a blower assembly 210, including a fan 212 driven by an electric motor 214 through a belt 216. The top of the pit 208 is closed by a plate 218 resting on a ledge 228. The discharge 220 of the fan 212 is connected to a vertical stack 222, which extends through the plate 218 and is secured to the building sidewall 9 by bands 224. The stack 222 terminates at its upper end in an elbow section 226. The pit 208 has a drain 230 for removing moisture therefrom, and the motor 214 is supplied with electricity through wires in a conduit 232, FIG. 5.

It is thus seen that when one or more of the shutters 1 to 5 is opened, and the blower assembly 210 is operating, air will be drawn into the chamber 34, from whence it will be exhausted through the duct 204 and the vertical stack 222. The upwardly inclined open shutter or shutters cause air to be drawn along a confined path rearwardly under a motor vehicle disposed with its driving wheels W on the dynamometer rolls 24 to 30, as will be apparent from FIG. 2, and the resulting flow of air entrains exhaust gases, radiated waste heat, and any engine blow-by products discharged from the vehicle and carries such waste products into the chamber 34.

The open shutter or shutters restrict the source of air flowing into the chamber 34 to that drawn through the region beneath the motor vehicle A, and thus tend to limit air demands to such volume of air as is required to entrain the engine exhaust products and carry them into the chamber 34. In order to further restrict the flow path along which air is drawn into said chamber 34, the shutters 2 to 5 have downwardly depending end walls 234 welded thereto adjacent their opposite ends. Each end wall 234 comprises a 60° segment of a circle, and as shown in FIG. 3, the end walls are positioned so that they are receivable in the spaces between the sidewalls 36 and 38 of the chamber 34 and the outermost frame angle irons 112 and 138. A 60° segment of a circle for the end walls 234 allows the shutters 2 to 4 to be opened to an upward inclination of about 60°, wherein said end walls are effective to substantially eliminate the drawing of air from behind or from the sides of the shutter assembly 52. The shutter 1 can be opened to the same extent but the 60° segments have been omitted therefrom.

In using the vehicle exhaust system, the shutters 1 to 5 are initially closed. An automobile A, FIG. 2, is then driven through the doorway 12, along the lane 18 and over the shutter assembly 52, and is brought to rest with its rear drive wheels W cradled on the dynamometer rolls 24 to 30. The automobile A includes a tail pipe P, bent downwardly at its rear end as is common in many automobiles. A visual inspection is then made to determine the position of the outer end of the tail pipe P relative to the shutters 1 to 5. In FIG. 2, the end of the tail pipe P terminates above shutter 4, and consequently the shutters 4 and 5 are both opened to define therebetween a downwardly inclined opening or passage 236 into which the exhaust tail pipe P discharges. The blower 212 will withdraw air from the chamber 34 and air will be drawn along the bottom of the vehicle A into the inclined passage 236 and as it flows into the passage 236 it will entrain engine exhaust gas discharged from the tail pipe P and will carry the same into the chamber 34 for subsequent discharge to the outside of the building 6 through the vertical stack 222.

The upwardly inclined shutter 4 defines a forwardly opening passage 238, into which air from beneath the vehicle A will be drawn by the blower 212. The passages 236 and 238 formed by the shutters 4 and 5 provide a well directed air flow beneath the automobile A, while the end plates 234 on said shutters tend to confine the direction of air flow to the region beneath the vehicle. The flow of air thus established will collect by entrainment exhaust gases, engine blow-by products and radiated waste heat from beneath the vehicle A, and will carry the same into the chamber 34.

It is to be understood that various opening arrangements for the shutters 1 to 5 are possible, depending upon the requirements of a particular motor vehicle. Usually, only a minimum number of shutters is opened, whereby to provide only the amount of air flow needed to efficiently collect the engine waste products. The rear shutter 5, as has been described, is approximately one and one-half times the width of the other shutters, whereby when open it extends to an elevation sufficiently high to collect the discharge from a horizontally disposed and/or an unusually high tail pipe. It should also be noted that when any of the shutters 1 to 5 is open it serves as a guard to deflect downwardly into the chamber 34 any small stones or the like released from the tread and hurled rearwardly by the wheels W when they are rapidly revolving on the dynamometer rolls 24 to 30.

Engine blow-by products, radiated waste heat, and, occasionally, exhaust gases are discharged largely into a region immediately below the engine at the front of the automobile A. The vehicle exhaust system of the invention also provides for removal of waste products directly from this region, through a grate 240, FIG. 2, which also functions to help ventilate the building 6 when the shutters 1 to 5 are closed.

Positioned in the floor 16 centrally on the lane 18 and in front of the dynamometer 22 and below the grate 240 is a rectangular pit 242. The pit 242, as is shown in FIGS. 1 and 2, has a width about one-fifth as great as the length of the chamber 34, and a length about equal to the width of the shutter assembly 52, and includes sidewalls 244, a front wall 246, a rear wall 248, and an inclined bottom wall 250. The bottom wall 250 is inclined downwardly from the front wall 246 to the rear wall 248 at an angle of about 30 degrees, and the sidewalls 244, and the front wall 246 and the rear wall 248 terminate at their upper edge in a depressed ledge 252 upon which the grate 240 is received.

The front wall 42 of the chamber 34 and the rear wall 248 of the pit 242 have aligned openings 254 and 256, respectively, therein, within which are secured the opposite ends of a concrete duct 258 that connects the pit 242 with the chamber 34. The duct 258 is inclined downwardly toward the chamber 34, whereby any moisture entering the pit 242 will flow into the chamber 34 and will be drained therefrom through the drain 46.

The electric motor 214 for the blower assembly 210 is preferably of the two-speed type. When one or more of the shutters 1 to 5 is opened to collect and remove vehicle exhaust products, the electric motor 214 is usually operated at a relatively high speed to provide a rapidly moving air current, beneath the motor vehicle A, of a volume sufficiently great to insure adequate removal of engine exhaust products; for small motor vehicles, operation of the blower assembly 210 at a lower speed may prove adequate. Air will then be drawn through the open shutters, as well as through the grate 240 into the pit 242, and the air flow entering the chamber 34 through both the open shutters and through the grate 240 will have entrained therein engine exhaust products.

When the shutters 1 to 5 are all closed, they act as a damper on the inlet of the blower assembly 210, and the damper effect thus created substantially reduces the horsepower required to drive the fan unit 212. With the shutters 1 to 5 closed and the blower assembly 210 still operating, air will then be drawn into the chamber 34 only through the grate 240, and this action can be employed to effect a continuous change of the air within the building 6 for as long as the blower assembly 210 is operated.

In order to protect personnel working in buildings or enclosures where a vehicle engine is being operated, local ordinances will frequently establish a minimum acceptable rate at which the contaminated air within a room should be exchanged for fresh air from the outside. It has been found that it is good practice to change the volume of air in a room where a motor vehicle engine is being operated under normal highway driving conditions from 10 to 15 times each hour, and thus this volume of air flow is available for use in the vehicle exhaust handling system. By proper design of the blower assembly 210, the shutter assembly 52, and the grate 240, the vehicle exhaust system of the invention can exchange the air at this high rate while a motor vehicle engine is being operated within the building 6, and also can exchange the air at a slower rate when the shutters 1 to 5 are closed and the vehicle engine is not running. The use of a two-speed motor 214 will add increased flexibility to the ventilation operation. Because the shutters 1 to 5 are constructed to permit air to be drawn primarily from the region beneath a motor vehicle the amount of air flow required for effective ventilation is held to a minimum, and hence unduly large burdens are not placed on the equipment normally employed to heat or cool fresh air supplied to the enclosure, and objectionable drafts are avoided.

The shutters 1 to 5 are provided with hydraulic jacks 260, 262, 264, 266 and 268, respectively, FIGS. 2, 6 and 8, which are arranged to be independently actuated for opening any one or more of said shutters. The hydraulic jacks 264 and 266 for operating the shutters 3 and 4, respectively, are identical and are mounted in the same manner, the arrangement for the hydraulic jack 266 being best shown in FIGS. 8 and 9A. A pair of vertical brackets 270 supports the hydraulic jack 266, each bracket 270 having a flange 272 at its upper end, which extends over the horizontal flange 164 or 166 on its associated angle iron member 108 or 134, the flanges 272 being secured by bolts 276. The brackets 270 have aligned openings at their lower end for receiving a bolt 280. The bolt 280 passes through a bore in a boss 282 on the lower end of a cylinder 284 of the hydraulic jack 266. The jack 266 is centered between the brackets 270 by a pair of spacers 286 received on the bolt 280, one spacer being disposed on each side of the boss 282.

The shutter 4 has a transverse, vertical plate 288 welded centrally to its undersurface. The jack 266 includes a piston rod 290, which projects upwardly from the cylinder 284, and terminates in a bifurcated head 292, which is pivotally connected to the plate 288 by a pin 294. The cylinder 284 has an inlet fitting 296 at the lower end thereof for admitting fluid below a piston (not shown) connected with the piston rod 290, and an open vent fitting 298 is mounted at the upper end of said cylinder. Thus, the shutter 4 can be moved from a closed, horizontal position to an upwardly inclined open position, as shown in FIG. 8, by supplying fluid through the fitting 296, whereupon the piston rod 290 is extended to open said shutter.

The shutter 4 is urged toward its closed, horizontal position by a pair of return or tension springs 300, one of said springs being disposed on each side of the jack 266. An angle iron 302 is welded centrally to the shutter 4 just inwardly of its hinged rear edge, and one end of each spring 300 is hooked into an opening in the downwardly depending flange 304 of said angle iron. The lower end of the return spring 300 is anchored to the horizontal flange 164 and 166, respectively, by straps 306. Each strap 306 includes a horizontal portion 308, secured to its associated flange 164 or 166 by one of the bolts 276, and an upwardly inclined portion 310 having an opening therein within which the lower end of the associated spring 300 is hooked.

The shutter 4 will remain in an open position so long as fluid under pressure is supplied to the jack 266 through the fitting 296. When the fitting 296 is connected to drain, the return springs 300 are effective to urge the shutter 4 and the piston rod 290 downwardly until the shutter 4 is closed.

The jack 264 for operating the shutter 3 is similar to and is mounted identically to the jack 266, and a pair of return springs 312 is arranged in the same manner as the springs 300 for urging said shutter toward its closed position. The jack 268 for operating the shutter 5 is supported by brackets 314, and is constructed and arranged in a manner identical to the jacks 264 and 266. However, because the shutter 5 has a greater width than the shutters 1 to 4, the jack 268 is longer than the jacks 264 and 266 in order to provide a stroke of sufficient length to open said shutter. The shutter 5 is urged toward its closed position by a pair of return springs 316, arranged like the return springs 300 and 312.

Figure 11A:
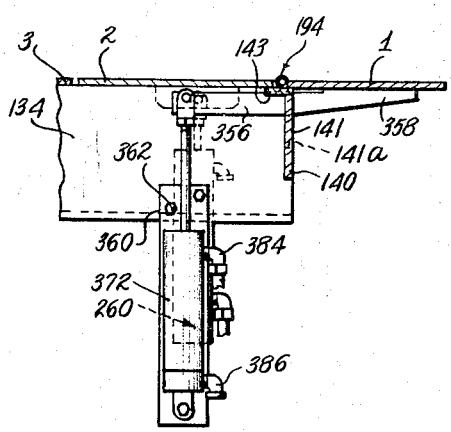
FIG. 11A is a fragmentary sectional view, taken on the line 11A—11A in FIG. 6, showing in side view, the hydraulic jack and the lever arm for operating the front shutter.

The manner in which the jacks 260 and 262 for the two front shutter plates 1 and 2, respectively, are mounted is best shown in FIGS. 11 and 11A, the jack 262 being identical to the jacks 264 and 266. Thus, a pair of brackets 318 and 320, having a flange 322 and 324, re-respectively, on their upper end, is secured to the horizontal flange 164 and 166 of the angle irons 108 and 134, respectively, by bolts 326. The bracket 320 has an opening 328 at its lower end, which is aligned with an opening 330 in the bracket 318, which is substantially longer than the bracket 320. A bolt 332 having a pair of spacers 334 thereon extends through the openings 328 and 330, and through a bore in a boss 336 on the lower end of the cylinder 338 of the jack 262, and functions to mount said jack. The shutter 2 has on its undersurface a centrally positioned plate 340, corresponding to the plate 288, to which a bifurcated head 342 on the upper end of a piston rod 344 is connected by a pin 346. The jack 262 has supply and vent fittings 348 and 350, respectively, and functions identically to the jacks 264, 266 and 268 to open the shutter 2 when fluid under pressure is supplied to the fitting 348. A pair of tension springs 352 is mounted between a downwardly depending flange on an angle iron 354 secured to the undersurface of the shutter 2, and a pair of anchor straps 356 is secured to the flanges 164 and 166 by the bolt 326, said springs functioning like the return springs 300, 312 and 316 to close the shutter 2 when the supply fitting 348 is connected to drain.

The front shutter 1 is positioned over the rear end of the bottom wall 56, FIG. 8, of the pit 54, and hence the jack 260 cannot be mounted immediately therebelow, as is done with the shutters 2 to 5. Instead, the jack 260 is mounted beside the jack 262, FIG. 11, and is connected to the projecting rear end 356, FIG. 11A, of the lever 358 welded to the undersurface of the shutter 1, the lever 358 being arranged so that when its end 356 is pulled downwardly, the shutter 1 will be opened. The vertical flange 141 of the fabricated angle iron 140 has a cutout 141a therein through which the lever arm 358 extends.

A vertically extending bracket 360, FIGS. 11 and 11A, is secured at its upper end to the vertical flange of the angle iron 134 by a bolt 362, and lies in a common transverse plane with the brackets 318 and 320. The bracket 360 extends downwardly a distance identical to the downward projection of the bracket 318. The brackets 318 and 360 have aligned openings 364 and 366, respectively, through their lower end. A shaft 368 serves as a spacer between the brackets 318 and 360 and has end portions that extend through the openings 364 and 366. One end projects beyond the outer face of the bracket 360 and through a bore in a boss 370 on the lower end of a cylinder 372 of the jack 260. The boss 370 is secured on the shaft 368 by a nut 374 and a washer 375, and is spaced from the bracket 360 by a sleeve 376. A nut 369 on the other end of the shaft 368 secures it to the bracket 318.

The jack 260 includes a piston (not shown) connected with a piston rod 380 that terminates in a bifurcated head 378, secured to the end 356 of the lever 358 by a pin 382. The jack 260 has a pressure supply fitting 384 at its upper end for admitting fluid into the housing 372 above the piston connected to the rod 380 and an open vent fitting 386 at the lower end of the cylinder 372. Thus, when hydraulic fluid under pressure is supplied to the fitting 384, the piston rod 380 will move downwardly, and the shutter 1 will be opened. When the supply fitting 384 is connected to the drain, the weight of the shutter 1, applied over the length of the lever 358, will return said shutter to its closed position and will cause the piston rod 380 to be extended. Springs may be provided to return the shutter 1 to closed position, if desired, although the present lever arrangement does not require return springs. It should be noted that the piston rod 380 of the jack 260 is retracted or moved downwardly to open the shutter 1; whereas, the piston rods of the hydraulic jacks 262, 264, 266 and 268 are extended or moved upwardly to open their associated shutters 2 to 5.

The jacks 260, 262, 264, 266 and 268 are all connected into a hydraulic circuit, FIG. 18, including a plurality of solenoid-operated valves 392, 394, 396, 398 and 400, one valve for each jack, arranged so that the jacks 260 to 268 can be separately and selectively actuated to effect opening of any one or more of the shutters 1 to 5. Fastened to the bottom flange 166 of the angle iron 134 by bolts 388 is a control box 390, FIG. 12, upon the lower wall 391 of which are mounted the solenoid valves 392 to 400.

Secured to the vertical flange of the angle iron 134 by a bracket 402 and bolts 404, FIGS. 6, 8 and 9, is a hydraulic fluid storage tank 406. The tank 406 is positioned rearwardly of the control box 390 and includes an air pressure supply inlet fitting 408 at the top thereof, and hydraulic fluid supply and return fittings 410 and 412 mounted on the opposite sides of the tank at the lower end. A centrally positioned boss 414 is carried by the bottom wall of the tank 406. The boss 414 is connected by a nipple 415, a T-fitting 416, a nipple 418, and an elbow 420 to a vertical stand pipe 422, which terminates in a threaded fitting 424, FIG. 10, mounted upon its upper end. Received on the fitting 424 is a cap 426, which has a radially extending bleed hole 428 therein, positioned so that when the cap 426 is fully threaded on the nipple 424 said hole 428 will be closed. By backing the cap 426 off a short distance on the nipple 424 the bleed hole 428 will be connected with the interior of the stand pipe 422. A safety feature is thus provided, whereby any flow of fluid from the bleed hole 428 will warn that the tank 406 is under pressure before the cap 426 is entirely removed. A removable plug 429 mounted in the lower end of the T-fitting 416 serves as a drain for the tank 406.

Referring now in particular to FIG. 18, the inlet of the solenoid valves 392, 394, 396, 398 and 400 are all connected by conduits 430, 432, 434, 436 and 438, respectively, to a single supply conduit 440 leading from the pressure supply fitting 410 on the tank 406. The outlet of the solenoid valve 392 is connected by a conduit 442 to one end of a T-fitting 444, the stem of said fitting being connected by a conduit 446 to the pressure supply fitting 384 on the jack 260 for opening shutter 1. The other end of the fitting 444 is connected through a conduit 447, containing a one-way check valve 448, to a return manifold 450, connected to the return fitting 412 on the tank 406.

The outlet of the solenoid valve 394 is similarly connected by a conduit 452 to a T-fitting 454, the stem of which is connected to the pressure supply fitting 348 of the jack 262 by a conduit 456. The fitting 454 is connected through a one-way check valve 458 by a conduit 460 to the manifold return 450.

The solenoid valves 396, 398 and 400 are similarly connected through conduits 462, 464, 466, T-fittings 468, 470, 472, and conduits 474, 476, 478, respectively, to the pressure supply ports of the jacks 264, 266 and 268. The fittings 468, 470 and 472 are connected through one-way check valves 480, 482, 484 by conduits 486, 488, 490, respectively, to the return manifold 450. The check valves 448, 458, 480, 482 and 484 are all designed to permit flow only in a direction from their associated jacks into the return manifold 450, as indicated by the arrow adjacent each check valve. Positioned in the manifold 450, downstream of the last check valve 484, is another one-way check valve 492, arranged to permit flow only in a direction from the jacks to the return fitting 412 on the tank 406. Thus, fluid under pressure can leave the tank 406 only through the supply fitting 410, and return to said tank only through the manifold 450, the check valve 492 to the return fitting 412.

The solenoid valves 392 to 400 are each designed so that they will be closed when de-energized, this being their normal condition. The solenoid valves 392 to 400 are operated by a plurality of push-button switches 494, 496, 498, 500 and 502, respectively, FIG. 7, mounted on a pendant control box 504, which is connected by a cable 506 to the control box 390, FIG. 8. Referring again to FIGS. 6 and 8, the space between the rearmost shutter 5 and the rear edge of the chamber 34 above the ledge 48 is bridged by a cover plate 508, which has an upwardly opening rectangular container 510 sunk therein within which the pendant control box 504 can be stored when not in use. The length of the cable 506 attached to the pendant control box 504 is sufficient to permit an operator to move about the rear of a vehicle to carefully observe the position of the vehicle relative to the shutters 1 to 5, whereby to assure opening of the shutters nearest to the end of the tail pipe P, for example, shutters 4 and 5, as in FIG. 2.

Returning again to FIG. 18, the push-button switches 494 to 502 are connected by leads, comprising the cable 506, to a terminal block 512 which is mounted within the control box 390. The terminal block 512 includes a pair of terminal strips 514 and 516, which are connected by leads 518 and 520, respectively, to a pair of main terminals in the control box 88, which is mounted on the rear face of the dynamometer frame 68, said control box being supplied with electrical current through main conductors 522 and 524 extending from a suitable power source.

One contact on the solenoid valves 392, 394, 396, 398 and 400 is connected by a lead 528, 530, 532, 534 and 536, respectively, to contacts along the terminal strip 516. The other contact on the solenoid valve 392 is connected by a lead 536 to a contact 538 on the terminal block 512, and the contact 538 is, in turn, connected by a lead 540 to one contact of the push-button switch 494, opposite the numeral "1" on the face of the pendant control box 504, FIG. 7, to indicate that said switch controls the jack 260 for the shutter 1. Similarly, the other contacts on the solenoid valves 394, 396, 398 and 400 are connected by leads 542, 544, 546 and 548 to contacts 550, 552, 554 and 556, respectively, on the terminal block 512, and from thence to the contacts on one side of the push-button switches 496, 498, 500 and 502 by leads 543, 545, 547 and 549, respectively, said switches being numbered "2", "3", "4" and "5" on the face of the pendant control box 504 to indicate the associated shutters controlled thereby. The other contacts of the switches 494, 496, 498, 500 and 502 are connected by a common lead 558, which is connected to the other power lead 514 at a contact 560 on the terminal block 512. A ground lead 562 connects the pendant control box 504 with the terminal block 512, and a similar ground lead 564 connects said terminal block to the control box 88. It is thus seen that when electrical current is supplied to the terminal strips 514 and 516, any one of the solenoid valves 392 to 400 can be operated merely by depressing and closing the associated push-button switch 494 to 502, respectively, and a solenoid valve thus energized to open will remain open until its associated switch is allowed to open.

The air pressure supply fitting 408 on the tank 406 is connected by a conduit 566 to the outlet port 568 of a three-way solenoid valve 570 mounted in the control box 390, FIGS. 12 and 13. The solenoid valve 570 also has an inlet port 572, FIG. 18, and an exhaust port 574, and is designed so that when deenergized the supply port 572 will be connected with the outlet port 568, as is indicated by the solid arrow 576. This is the normal condition for the valve 570. When the solenoid valve 570 is energized, the connection between the supply port 572 and outlet port 568 will be broken, and instead the outlet port 568 will be connected with the exhaust port 574, as indicated by the dotted arrow 578. Thus, when the solenoid valve 570 is energized the air pressure in the tank 406 will be relieved through the exhaust port 574.

The solenoid valve 570 is supplied with air under pressure through a supply conduit 580, which contains a pressure regulator 582 mounted on the angle iron 134, FIG. 8. The tank 406 may contain hydraulic fluid F sufficient in volume to effect operation of all of the jacks 260 to 268. When it is desired to render the jacks 260 to 268 operable, air pressure is supplied through the conduit 580, regulator 582, the solenoid valve 570, and the conduit 566 to the top of the vertical tank 406 to pressurize it. The shutter assembly 52 is then ready for operation.

When it is desired to open any one or more of the shutters 1 to 5, the appropriate push-button switch 494 to 502 is depressed, thus energizing and opening the appropriate solenoid valve 392 to 400. Fluid will then be supplied to the pressure supply fitting on the appropriate jack 260 to 268, which as has been described will effect opening of the associated shutter 1 to 5. When the shutter has been opened to the desired extent, its associated push-button switch is released and the de-energized solenoid valve closes. The pressure in the tank 406 prevents the return of fluid through the port 412 and, hence, the open shutter will be maintained stationary in its open position.

When it is desired to close the shutter or shutters which are open, a push-button switch 586 on the pendant control box 504, labeled "DOWN," is depressed. One contact of the switch 586 is connected to the common lead 558, and the other contact thereof is connected by a lead 588 to a contact 590 on the terminal block 512. One contact of the solenoid valve 570 is connected by a lead 592 to the terminal strip 516, and the other contact of said valve is connected by a lead 594 to the contact 590. Thus, when the "DOWN" switch 586 is depressed, the solenoid valve 570 will be energized to open and connect the tank 406 with the exhaust port 574, thus relieving the air pressure in said tank. Consequently, the pressure on the jacks of the shutters 1 to 5 will be relieved, and any energized jack will exhaust through its associated check valve 448, 458, 480, 482, or 484 to the manifold return conduit 450, and thence into the tank 406 through the return fitting 412. The force for causing such return flow is provided by the return springs on the shutters 2 to 5, and by the weight of the shutter 1 applied through the lever arm 358. Such forces move the piston rods of the jacks 260 to 268 associated with any shutter 1 to 5 that is open, in a direction to force exhausting of fluid from such jack into the manifold 450 and thence back into the tank 406.

As has been mentioned earlier, the shutter assembly 52 is interlocked with the wheel lift apparatus of the dynamometer to prevent operation of the lift apparatus while any one of the shutters 1 to 5 is open, and to prevent opening of any of the shutters while the brake actuating diaphragms 82 are inflated. Referring again to FIG. 18, there is diagrammatically shown a pair of three-way solenoid valves 596 and 598, said valves being housed in the control box 88 and including inlet ports 600 and 602, respectively, which are connected by conduits 604 and 606, respectively, to a four-way fitting 608. The fitting 608 is also disposed in the control box 88, and one leg thereof is connected to the conduit 94 leading from a source of supply of pressurized air.

The solenoid valve 596 includes an outlet port 612 and an exhaust port 614, and the solenoid valve 598 similarly includes an outlet port 616 and an exhaust port 618. The solenoid valves 596 and 598 are designed so that when de-energized, which is their normal condition, the outlet ports 612 and 616 will be connected with the exhaust ports 614 and 618, respectively, as indicated by the solid arrows 620 and 621. When the solenoid valves 596 and 598 are energized, they will shift to connect the outlet ports 612 and 616 with the supply ports 600 and 602, respectively.

The outlet port 616 of the solenoid valve 598, which is the valve that controls "UP" or lifting movement of the wheel lift apparatus, is connected by a conduit 622 to the inlet port 624 of a conventional pressure operated three-way valve 626, which is also housed in the control box 88. The valve 626 includes an outlet port 628 and an exhaust port 630, and is operated by fluid supplied to a pressure port 631 through a conduit 632 leading from a T-fitting 634 connected in the manifold return line 450 between the check valve 484 and the check valve 492. The valve 626 is designed so that when fluid under pressure is supplied thereto from the manifold 450, which condition occurs only when the tank 406 is pressurized and after any one of the solenoid valves 392 to 400 is operated to supply pressure to its associated jack 260 to 268, the connection between inlet port 624 and the outlet port 628, indicated by the solid arrow 636, will be broken. Instead, the outlet port 628 will then be connected to the exhaust port 630, as indicated by the dotted arrow 638. The valve 626 is spring loaded, so that when fluid pressure within the line 632 is relieved upon opening of the solenoid air control valve 570, the valve 626 will return to its normal condition, wherein the inlet port 624 is connected with the outlet port 628.

The outlet port 612 of the solenoid valve 596, which is the valve that controls "DOWN" movements of the wheel lift apparatus, is connected to a pressure port 641 at one end of a conventional, four-way, pressure operated valve 640 by a conduit 642. The other end of the valve 640 has a pressure port 643 therein, which is connected by a conduit 644 to the outlet port 628 of the valve 626. The valve 640 has an air pressure supply port 646 which is connected to the fitting 608 by a conduit 648, a pair of outlet ports 650 and 652, and a pair of air exhaust ports 654 and 656. The outlet port 650 is connected to the conduit 580, which provides air to pressurize the tank 406, and the outlet port 652 is connected to the conduit 86 for supplying air pressure to actuate the tubular diaphragms 82.

The valve 640 has two positions, and is operated by pressure supplied to the pressure ports 641 and 643 at the opposite ends thereof by the air conduit 642 and the air conduit 644. When the conduit 644 is connected to exhaust through the port 630 of the valve 626 and air pressure is supplied to the pressure port 641 through the conduit 642, the valve 640 will assume its first position, wherein the outlet port 650 is connected with the supply port 646 to supply air under pressure to the tank 406, and the outlet port 652 is connected with the exhaust port 656 so that any air pressure within the diaphragms 82 will be relieved to release the roll brakes and allow the arms 80 to drop to the position shown in FIG. 2. The valve 640 will remain in this first position for so long as pressurized fluid is maintained in the conduit 632, and thereafter until the valve 640 is moved into its second position by exhausting pressure through port 641 while supplying pressure through the port 643.

When the tank air pressure control valve 570 is de-energized to relieve pressure within the tank 406, the spring-loaded valve 626 will automatically shift to connect the air supply port 624 with the outlet port 628. If then the solenoid valve 598 is operated while the air pressure port 641 is connected with the exhaust port 614, air pressure will be supplied through the conduit 644 to the port 643 and the valve 640 will shift to its second position, wherein the outlet port 650 is connected to the exhaust port 654 and the air supply port 646 is connected to the outlet port 652. The supply of air pressure to the tank 406 is then cut off, and hence none of the shutters 1 to 5 can be operated. At the same time, air pressure supplied through the conduit 86 to the tubular diaphragms 82 will elevate the lift arms 80 to brake the dynamometer rolls 24 to 30 and raise the wheels W out of contact with said rolls.

The valve 640 can be shifted back into its first position to deflate the diaphragms 82 after the solenoid valve 598 has returned to its normal de-energized condition, wherein the pressure port 643 is connected with the exhaust port 618. Energization of the "DOWN" valve 598 will then cause the valve 640 to shift to its first position, wherein conduit 86 is connected with the exhaust port 654.

The solenoid valves 596 and 598 are operately remotely by a switch unit 658, which includes an "UP" switch 660 and a "DOWN" switch 662 connected by power leads 664 and 666 to the control box 88. The "UP" switch 660 is connected by leads 668 and 670 to the solenoid of the valve 598, and the "DOWN" switch 662 is connected by leads 672 and 674 to the solenoid of the valve 596.

The interlock between the shutter assembly 52 and the wheel lift apparatus is such that when any one of the shutters 1 to 5 is open, the wheel lift apparatus cannot be operated. Thus, the interlock ensures that a motor vehicle cannot be driven from the dynamometer rolls 24 to 30 while any one of the shutters 1 to 5 is open, and the possibility of damage to the shutters or to the vehicle from such a circumstance is eliminated.

It is to be understood that the hydraulic jacks 260 to 268 can be operated solely by air pressure without any hydraulic fluid and/or be replaced by other mechanical operating means, and indeed if desired all mechanical means for operating the shutters can be replaced by manually operated means. An embodiment of the invention wherein manual operation of the shutters is employed is shown in FIGS. 14 and 15, wherein elements identical to the corresponding elements in FIGS. 1 to 13 and 18 bear identical reference numerals.

Referring to FIGS. 14 and 15, a shutter assembly 676 is shown, including a pair of confronting angle irons 678 and 680 disposed with their opposite ends resting on the ledges 48 and 50 at the top of chamber 34, the angle irons being secured to said ledges by bolts 682. Rearwardly facing channel members 684, 686, 688, 690 and 692 are welded between the top edges of the vertical flanges of the angle irons 678 and 680, and are arranged similarly to the channel members of the embodiment shown in FIGS. 1 to 13 to define parallel, rectangular openings therebetween. Shutters 1' to 5' are hinged along their rear edges to the channel members 684–692, respectively, each shutter having a length greater than the distance measured between the sidewalls 36 and 38 of the chamber 34. Each of the shutters 1' to 5' has downwardly extending end plates 694 welded near its opposite ends, which correspond to the segmental plates 234 shown in FIGS. 1 to 13.

The shutters 1' to 5' are manually operable, and a spring detent device is provided for each to retain it in a desired position. The vertical flange of the angle iron 678 has five circular openings 696, 698, 700, 702 and 704 therein lying in the same horizontal plane, each of said openings facing the central portion of its associated shutter end plate 694. Detent supporting arms 706, 708, 710, 712 and 714 are welded to the front faces of the channel members 684 to 692, respectively, and are spaced inwardly a short distance from the vertical flange of the angle iron 678. Mounted on the projecting end of each support arm 706 to 714 is a plunger 716, the base end of each plunger being slidably received within a bore 718 in its associated supporting arm 706 to 714, with the front end of the plunger extending through its associated opening 696 to 704 and terminating in an enlarged head 720. A coil spring 722 is mounted on each plunger 716 to extend between its head 720 and the associated supporting arm 706 to 714, and functions to urge said head 720 into tight frictional engagement with its associated end plate 694, sufficient to retain the associated shutter 1' to 5' in any selected open angular position.

The shutters 1' to 5' also have counterweights, which help the spring detents to hold the shutters in an open position, and which make it possible to manually operate the shutters with the application of little force. Thus, two L-shaped arms 724 are welded at the upper end of their vertical leg 726 to the medial undersurface of each shutter 1' to 5', and the lower horizontal leg 728 of each arm projects rearwardly beyond the hinged rear edge of its associated shutter. A counterweight 730 is supported between the rear end of each pair of legs 728, and is selected in each instance to balance the associated shutter 1' to 5' so as to provide for substantially fingertip operation thereof. The rear wall 40 of the chamber 34 is provided with a recess 732 for receiving the rearmost of the counterweights 730, which is carried by a pair of arms which is larger than the remaining pairs of arms.

It may be desirable in some instances to employ a different blower assembly and exhaust stack arrangement from that shown in FIGS. 4 and 5, one modification being shown in FIGS. 16 and 17, wherein like elements bear the same reference numerals as in FIGS. 1 to 13.

Referring to FIGS. 16 and 17, a pit 734 is provided on the outside of the footing 8 at the base of the sidewall 9 of the building 6 opening to the duct 204. A stack 736 is connected to the open upper end of the pit 734 and extends vertically along the wall 9, to which it is secured by bands 738.

Positioned on the roof 14 is a blower assembly 740, including a fan 742 driven by an electric motor 744 through a belt 746. The inlet of the fan 742 is connected to the vertical stack 736 by a horizontal stack 748 and an elbow 750. The blower assembly arrangement of FIGS. 16 and 17 operates generally like the blower assembly of FIGS. 4 to 6, to withdraw air and waste products from the chamber 34 to which it is connected.

It is obvious that a vehicle exhaust system has been provided that meets all of the objectives set forth, and that many modifications and variations of the invention are possible in the light of the above teachings. It is therefore to be understood that within the scope of the appended claims, the invention may be practiced otherwise than as specifically illustrated and described.

I claim:

1. A system for collecting and removing engine exhaust products discharged from a motor vehicle positioned in an enclosed space with its engine operating, comprising: a floor on which a motor vehicle having engine exhaust pipe means can be driven, said floor including a location whereon said motor vehicle can be stationarily positioned with its engine operating, said floor also having an upwardly opening chamber therein positioned in relation to said location, so that at least a portion of the discharge end of said engine exhaust pipe means will be directed thereover when said vehicle is disposed on said location; and a shutter assembly, including: frame means located at the upper end of said chamber, a plurality of selectively operable shutters, each of said shutters being hinged along its rear edge to said frame means, and being movable between a closed position, wherein the top surface thereof lies generally flush with said floor, and an open position, wherein the shutter is raised above said floor to an angular position to define a passage facing toward said location and leading to said chamber, said chamber having an outlet opening through which air and any engine exhaust products can be evacuated therefrom.

2. A system as recited in claim 1, wherein means is connected with the outlet of the chamber for drawing air and engine exhaust products into said chamber through said passages formed by said raised shutters and evacuating the same from said chamber.

3. A system as recited in claim 1, including additionally, means associated with each shutter for retaining said shutter in any desired angular open position thereof.

4. A system as recited in claim 1, including additionally, means arranged between the frame means and the shutters, operable to selectively individually open one or more of said shutters and to effect closing of said shutters.

5. A system as recited in claim 4, wherein the means for selectively individually opening the shutters includes a plurality of remotely controlled fluid pressure operated jacks, one of said jacks being connected with each shutter.

6. A system as recited in claim 1, wherein the chamber and the shutters extend transversely of the longitudinal center line of, and wherein the shutters are of sufficient length to extend a substantial distance beyond the opposite sides of, a motor vehicle positioned on the specified location.

7. A system as recited in claim 1, wherein the opposite ends of one or more of the shutters has a downwardly-extending end wall which substantially closes the ends of the passage formed by such shutter when open.

8. A system as recited in claim 2, including additionally: a pit in the floor forwardly of the chamber and positioned generally under the longitudinal center line of the vehicle; and duct means connecting said pit with said chamber, whereby when the evacuating means is operated, air and engine exhaust products in the region of said pit will be drawn through said pit and said duct means into said chamber and evacuated from said chamber.

9. Means for use with a floor on which a motor vehicle can be driven and having an upwardly opening chamber in the path of said vehicle comprising: a shutter assembly including a frame to be located at the upper end of said chamber, and having a plurality of spaced, parallel structural frame members extending transversely of said vehicle path; a plurality of shutters each having a rear edge hinged to said frame members, each shutter being movable from a closed, generally horizontal position resting on said frame, with the front, rear and end edges of each shutter resting directly on and being supported by said frame whereby to give support to a motor vehicle driven over said shutter assembly, to a fully open, angular position; and means connected with each shutter operable to individually retain each shutter in any angular position from closed to and including said fully open position independently of any other of said shutters.

10. Means as recited in claim 9, wherein means is connected with one or more of said shutters to normally urge the same toward, and to retain the same in, closed position.

11. In combination: a floor on which a motor vehicle having muffler tail pipe means can be driven; testing apparatus, including roll means for receiving and supporting the drive wheels of a motor vehicle to be tested, said floor having an upwardly opening chamber positioned rearwardly of said roll means and over which at least the discharge position of the muffler tail pipe means will be directed when the drive wheels are supported on said roll means; a shutter assembly, including: frame means located at the upper end of said chamber; a plurality of individually operable shutters carried by said frame means, each of said shutters being movable between a closed position, wherein the top surface thereof lies generally flush with said floor, and an open position, wherein the shutter is upwardly inclined and defines a passage facing toward said roll means and leading to said chamber, said chamber having an outlet; and means connected with said chamber outlet for evacuating air and engine exhaust products from said chamber, said shutters when in an upwardly inclined position serving, when said evacuating means is operating, to provide passage means through which to draw air from beneath a vehicle placed on said roll means and to direct said air and any entrained exhaust products into said chamber, and to limit the flow of air from the region behind said shutter assembly.

12. The combination as recited in claim 11, including additionally means connected with said shutters and being operable to selectively open any one or more of said shutters.

13. The combination as recited in claim 12, wherein the roll means includes wheel lift apparatus operable to lift the wheels of a vehicle disposed on said roll means out of engagement therewith; and means interlocking said wheel lift apparatus with said shutter opening means arranged so that: (1) said shutter opening means is inoperable to open said shutters while said lift apparatus is being operated to lift the wheels of a vehicle out of engagement with said roll means, and (2) said wheel lift apparatus is inoperable to lift vehicle wheels from said roll means when any of said shutters is open.

14. The combination as recited in claim 13, wherein the shutter opening means is fluid pressure actuated and includes a fluid system and remote control means; and wherein the wheel lift apparatus is fluid pressure actuated and includes a separate fluid system and remote control means; and wherein the interlocking means is connected with both said fluid systems for maintaining the same operable only alternately and preventing simultaneous operation thereof.

15. In combination: a floor on which a motor vehicle having engine exhaust pipe means can be driven; vehicle testing apparatus, including roll means for receiving and supporting the drive wheels of a motor vehicle to be tested, said floor having an upwardly opening chamber therein rearwardly of said roll means and over which at least the discharge portion of said engine exhaust pipe means will be disposed when said drive wheels are supported on said roll means; wheel lift apparatus associated with said roll means and operable to lift the wheels of a vehicle disposed on said roll means out of engagement therewith; a shutter assembly, including: frame means located at the upper end of said chamber, and a plurality of individually operable shutters, each of said shutters having one edge hinged to said frame means and being movable between a closed position, wherein the top surface thereof lies generally flush with said floor, and an open position, wherein the shutter is raised to an angular position and defines a passage leading to said chamber; remotely controlled means arranged between said frame means and said shutters, operable to selectively open any one or more of said shutters, the shutter outwardly of and nearest to the discharge portion of said engine exhaust pipe means deflecting the discharged exhaust gas downwardly into said chamber; interlock means connected with said shutter opening means and said wheel lift apparatus, and arranged and operable so that: (1) when said wheel lift apparatus is operated to lift vehicle wheels from said roll means, said shutter opening means is rendered ineffective to open any of said shutters; and (2) when any one, or more, of said shutters is open, said wheel lift apparatus cannot be operated to lift vehicle wheels from said roll means; and means connected with said chamber operable for evacuating therefrom air, and any engine exhaust products entrained in said air.

16. The combination as recited in claim 15, wherein the chamber and the shutters extend a substantial distance beyond the sides of a motor vehicle disposed on the rolls, and wherein the opposite ends of one or more of said shutters have downwardly extending end walls thereon arranged to substantially close the ends of the passages formed by said shutters when they are in an open position.

17. The combination as recited in claim 15, including additionally a pit in the floor positioned forwardly of said roll means and generally under the vehicle; and duct means connecting the pit with the chamber.

18. Means for use with a floor having an area of travel along which a motor vehicle having an engine exhaust pipe can be driven and having an upwardly opening chamber in the path of said vehicle area of travel, comprising: apparatus for performance testing a motor vehicle, including roll means to be disposed in said vehicle path for receiving and supporting the drive wheels of a motor vehicle to be tested; wheel lifting apparatus associated with said roll means operable to lift vehicle wheels supported on said roll means out of engagement therewith; means to be disposed in said vehicle path rearwardly of said roll means operable for collecting and removing engine exhaust products discharged from the engine exhaust pipe means of a motor vehicle disposed with its drive wheels on said roll means, and including: a frame, a plurality of shutters, each shutter having one edge hinged to said frame, and a device connected with each shutter for individually operating the same from a closed, generally horizontal position to an open position inclined toward said roll means; and a control system connected with said wheel lifting apparatus and with said shutter operating devices, and arranged so that when said wheel lifting apparatus is being operated to lift vehicle wheels from said roll means, said shutter operating devices are rendered ineffective to open said shutters, and so that when any one of said shutter operating device is being operated to open its associated shutter, said wheel lifting apparatus is rendered ineffective to lift vehicle wheels from said roll means.

19. The combination recited in claim 18, wherein the wheel lifting apparatus is pneumatically operated, and wherein each shutter operating device includes a hydraulic jack, and wherein the control system includes: a tank containing hydraulic fluid, and having an air pressure inlet port, a hydraulic fluid outlet port, and a hydraulic fluid return port; first conduit means connecting said hydraulic fluid outlet port with said hydraulic fluid return port; means connecting each hydraulic jack with said first conduit means, and including remotely controlled valve means operable for controlling the supply of hydraulic fluid to its associated jack; a single check valve in said first conduit means between all of said hydraulic jacks and said hydraulic fluid return port, arranged to permit flow only in a direction toward said hydraulic fluid return port; an air pressure supply control valve having an inlet port for receiving air under pressure, first and second air pressure outlet ports, and first and second air exhaust ports; second conduit means connecting said first pressure outlet port of said air pressure supply control valve to said air pressure inlet port of said tank; third conduit means connecting said second air pressure outlet port of said air pressure supply control valve to said pneumatic wheel lift apparatus; first operating valve means connected with said air pressure supply control valve and operable to actuate said air supply control valve so that said second pressure outlet port thereof is connected to said second of said exhaust ports thereof, and so that said first pressure outlet port thereof is connected with said air inlet pressure port thereof to thereby effect exhaust of pressure from said pneumatic wheel lift apparatus and to effect pressurization of said tank; second operating valve means connected with said air pressure supply control valve, and operable to actuate said air pressure supply control valve so that said first pressure outlet port thereof is connected to the first of said exhaust ports thereof, and so that said second pressure outlet port thereof is connected with said air inlet pressure port thereof so that said pneumatic lift apparatus is pressurized to effect operation thereof; an interlock valve connected between said second operating valve means and said air pressure control valve, responsive to hydraulic fluid pressure to render said second operating valve means ineffective to actuate said air pressure supply control valve; fourth conduit means connecting said interlock valve to said first conduit means at a point between said check valve and the means connecting said hydraulic jacks with said first conduit means, each hydraulic jack connecting means being arranged so that when its associated remotely controlled valve means is actuated to effect operation of the associated hydraulic jack, hydraulic fluid will be transmitted through said fourth conduit means to said interlock valve to effect operation thereof for rendering said second operating valve means ineffective; and remotely controlled exhaust valve means in said second conduit means operable to exhaust pneumatic pressure from said tank to thereby relieve hydraulic pressure within said first conduit means.

20. The combination recited in claim 19, wherein the remotely controlled valve means for controlling the supply of hydraulic fluid to the jacks are electric solenoid operated valves; and wherein the first and second operating valve means are electric solenoid operated; and wherein the remotely controlled exhaust valve means in the second conduit is electric solenoid operated; and wherein all of said solenoid operated valves are connected in an electric circuit with switches arranged to selectively operate each of said valves.

References Cited
UNITED STATES PATENTS

| | | | |
|---|---|---|---|
| 1,412,039 | 4/1922 | Bowman. | |
| 511,296 | 12/1893 | Ewald | 98—112 |
| 1,971,920 | 8/1934 | Ross | 98—43 |
| 2,293,065 | 8/1942 | Kiczales | 98—110 |
| 3,207,055 | 9/1965 | Small | 73—116 |

RICHARD C. QUEISSER, *Primary Examiner.*

JERRY W. MYRACLE, *Assistant Examiner.*

U.S. Cl. X.R.

98—43